Oct. 11, 1927.
S. W. MANN
1,645,149
DIRECT CURRENT GENERATOR SYSTEM
Original Filed Sept. 2, 1924
*Fig. 1*     *Fig. 2*     *Fig. 3*
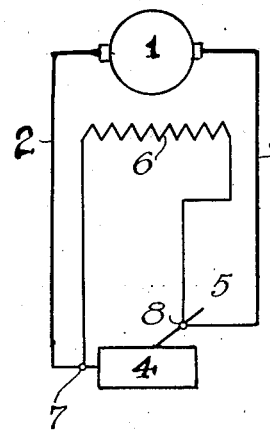 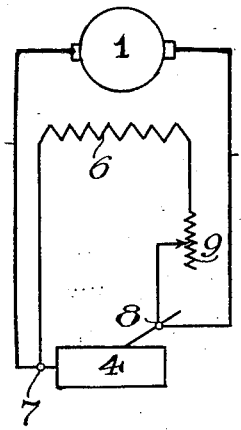 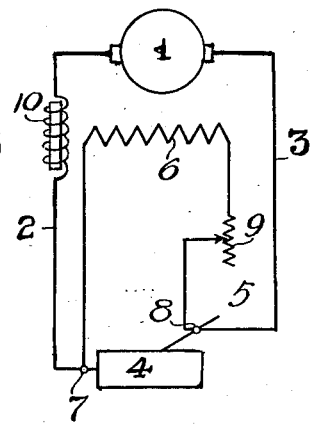
*Fig. 4*     *Fig. 5*     *Fig. 6*
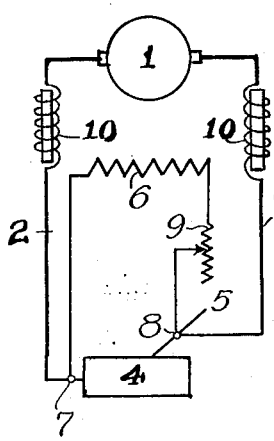 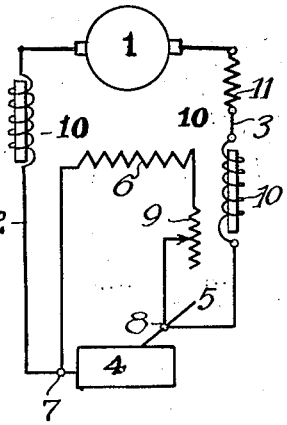 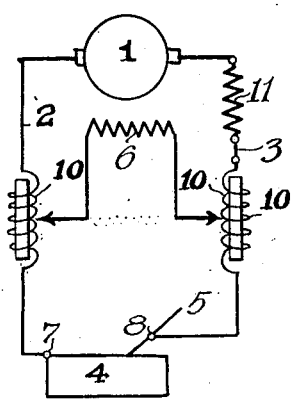
INVENTOR
Seward W. Mann,
by Edward A. Lawrence
his attorney.

Patented Oct. 11, 1927.

1,645,149

UNITED STATES PATENT OFFICE.

SEWARD W. MANN, OF PITTSBURGH, PENNSYLVANIA, ASSIGNOR TO H. KLEINHANS COMPANY, OF PITTSBURGH, PENNSYLVANIA, A CORPORATION OF PENNSYLVANIA.

DIRECT-CURRENT-GENERATOR SYSTEM.

Application filed September 2, 1924, Serial No. 735,310. Renewed February 18, 1927.

My invention relates to methods and means for controlling the current flow from direct-current generators and is especially adapted for direct-current generators having a load or a number of loads in series, and also for the control of the current consumed in any one or a series of consuming elements or translating devices, such, for example, as the current flowing through the fields of alternating current generators.

One object of my invention is to increase the efficiency of a direct current generator so that its output is substantially equal to the current consumed in the consuming element, plus the energy necessary to force the current to and from the current-consuming element. More specifically, I purpose so to control the flow of current from a direct-current generator that a constant current can be made to flow regardless of the variations in the resistance of the consuming element, or to cause the current to increase with increased resistance in the consuming element and to decrease with increased resistance in the said element, or vice versa. Also, I may cause the current to drop to any percentage of normal current down to as low as 5% with the decrease of resistance in the said element.

The said current-control system is not limited to any definite current-consuming element or translating device. I have taken herein, merely as an example of a current consuming element or translating device, an electric arc-welding system, which probably has the most variable current-consuming element there is.

Referring to the accompanying drawing, the six figures thereon illustrate diagrammatically six of the many methods or schemes by which the principles of my invention may be practiced.

In Fig. 1, I show a shunt-wound generator, having the armature 1, to whose brushes the two leads 2 and 3 are connected. At the outer end of the leads are the two electrodes 4 and 5, here shown as the work and the welding electrode, respectively. The shunt-field winding 6 is in this particular instance shown connected directly across the electrodes at the points 7 and 8, so that the connections of the electrode and field winding with the leads are subject to the same voltage and current conditions.

When the electrode 5 is placed in contact with the work 4, the armature is short circuited, but the current is kept down to predetermined value, because the voltage has been compensatingly decreased in the armature due to the reduced current flowing through the field winding. If the field winding were connected directly across the brushes of the generator, the closing of the work circuit through the work 4 by its contact with the electrode 5, would cause the current-strength to build up rapidly to a very high value, resulting in a current which would probably burn out the generator unless suitable protective means were provided.

When the arc is drawn at the electrode 5 a voltage drop occurs across the arc. A redistribution of the current between the field winding and the electrodes takes place. The current through the field winding increases in proportion to the voltage drop at the arc. Consequently the field strength is increased and the armature voltage is raised so that the armature will generate the same amount of current as before despite the added resistance in the work circuit. If the field is directly across the electrodes or work terminals, the field strength is increased or decreased as the resistance of the current-consuming device changes, and the current-strength of the armature remains substantially unchanged. Such a system is self regulating.

Any increase or decrease of the resistance through the arc causes a compensating increase or decrease, respectively, of current through the field-winding tending to prevent any material change in the amount of current generated and flowing across the arc from the armature.

In case it is desired to add more welding cable to the leads for distant work, each lead is extended beyond the connecting points of the field-winding with the conductors. No adjustment is required in this case because the added cable adds resistance which has the same effect as an increase of resistance in the arc itself. This added cable resistance tends to reduce the amount of current flowing across the electrodes, but the consequent strengthening of the generator field raises the voltage in the armature so that the current through the arc remains practically constant.

In Fig. 2, the parts are the same as in Fig. 1 except that the shunt-field circuit contains the field rheostat 9, by which working current of different values may be obtained to suit the required purposes or conditions.

In Fig. 3, I have placed in one of the leads the inductive winding or reactance 10 which reduces any changes of current impressed on the leads by the generator due to the lag in changing field flux density. I may place a reactance 10 in each lead as shown in Fig. 4, by which I get a somewhat better balancing of the current in the circuits.

In Fig. 5 I place a series field 11 in one of the leads, in addition to the shunt field 6, which may be used to give an over-compounded or under-compounded characteristic or to change the value of current flow, if desired.

In Fig. 6, the shunt-field is tapped adjustably to selected points on the windings of the reactances 10 in the leads 2 or 3. By this scheme the shunt-field is proportionately energized in reference to the voltage drop at the arc by suitably locating the taps on the reactances, giving a current-changing characteristic similar to the use of a field rheostat, but having a somewhat higher electrical efficiency.

According to my invention, the regulation of current flow and voltage is automatically proportioned by the arc or current-consuming element itself. No separate or outside excitation of the generator is required, nor is there any necessity for a bucking or boosting series field. Full regulation is obtained by impressing upon the shunt field winding a proportion of the voltage drop across the consuming element or translating device.

My invention could be applied to a heating element composed, for example, of wire of set resistance through which a certain amount of current could safely flow. By using my system of control whereby the leads 2 and 3 would be connected to opposite ends of the resistance element, more resistance could be cut in or some resistance could be cut out and there would still be a constant current through the said element.

I claim—

1. In a system for the regulation of current generated by a direct-current arc-welding apparatus, an armature, work-terminals between which a short circuit is made upon starting and an arc is drawn during welding, leads connecting the armature to the work-terminals, and a shunt field connected across the leads in parallel with the work terminals at such points with reference to the resistance in the leads on each side of the said points that, when a short circuit is made between the work-terminals, the shunt field remains so energized as to cause current of substantially no greater than predetermined normal welding value to flow through the work-terminals.

2. In a system for the regulation of current generated by a direct-current arc-welding apparatus, an armature, work-terminals between which a short circuit is made upon starting and an arc is drawn during welding, leads connecting the armature to the work-terminals, and a shunt field connected across the leads in parallel with the work terminals at such points with reference to the resistance in the leads on each side of the said points that, when a short circuit is made between the work-terminals, the shunt field remains so energized as to cause current of substantially no less than predetermined normal welding value to flow through the work-terminals.

3. In a system for the regulation of current generated by a direct-current arc-welding apparatus, an armature, work-terminls between which an arc is drawn during welding, leads connecting the armature to the work-terminals, and a shunt field connected across the leads in parallel with the work terminals at such points with reference to the lead resistance on each side of said points as will cause the shunt field to be proportionately strengthened or weakened when the voltage drop between the work-terminals is increased or diminished, respectively, whereby, when the circuit is closed between the work-terminals, the armature current regardless of variation in the resistance between the work-terminals, does not substantially rise above or fall below the predetermined normal welding value.

4. In a system for the regulation of current generated by a direct-current arc-welding apparatus, an armature, work-terminals between which an arc is drawn during welding, leads connecting the armature to the work-terminals, and a shunt field connected across the leads in parallel with the work terminals at such points with reference to the resistance in the leads between the armature and the work-terminals as will cause the shunt field to be proportionately strengthened or weakened when the voltage drop between the work-terminals is increased or diminished, respectively, whereby, when the circuit is closed between the work-terminals, the armature current regardless of variation in the resistance between the work-terminals, does not substantially rise above or fall below the predetermined normal welding value.

5. In a system for the regulation of current generated by a direct-current arc-welding apparatus, an armature, work-terminals between which an arc is drawn during welding, leads connecting the armature to the work-terminals, and a shunt field connected across the leads in parallel with the work terminals at such points with reference to the resistance in the leads between said points and the armature as will cause the field to be strengthened or weakened in proportion to the voltage drop between said points and the work-terminals plus the voltage drop between the work-terminals, whereby, when the circuit through the work-terminals is closed, the current regardless of the variations of the resistance in the said circuit does not vary substantially from a predetermined normal welding value.

6. In a direct current generator system for supplying current for arc welding and other operations requiring widely varying current consumption at a single operation, an armature, leads connecting the armature in series with the current consuming element, and a shunt field connected across the leads in parallel with the work terminals at such points with reference to the resistance in the armature leads on each side of such points, that the current in the armature circuit upon starting and under normal load will not rise substantially above or fall substantially below a predetermined normal load.

7. In a system for generating direct current, an armature, leads connecting the armature in series with a current consuming element, and a shunt field connected in a constantly-closed circuit across the leads at such points with reference to the resistance in the armature leads on each side of such points, that the current in the armature circuit will not rise substantially above or fall substantially below a normal predetermined value, whether the circuit through the said element is shorted through its terminals or contains varying amounts of resistance.

8. In a system for generating direct current, an armature, leads connecting the armature in series with a current consuming element, and a shunt field adjustably connected in a constantly-closed circuit across the leads at such points with reference to the resistance in the armature leads on each side of such points, that the current in the armature circuit will not rise substantially above or fall substantially below a predetermined normal load value.

9. In a system for the regulation of current generated by a direct current generator, an armature, leads connecting the armature in series with a current-consuming element, and a shunt field connected in a constantly closed circuit across the leads at such points, with reference to the resistance in the leads on each side of said points, as will cause the field to be proportionately strengthened or weakened when the voltage drops across the said element is increased or decreased, respectively, whereby, the current, regardless of variation in resistance of the said circuit, does not substantially rise above or fall below a predetermined value.

10. In a system for the regulation of current generated by a direct current generator, an armature, leads connecting the armature in series with a current-consuming element, and a shunt field connected across the armature leads in parallel with the work terminals at the points where the resistances of the armature leads between the armature and the field terminals and between the consuming element and the field terminals are so proportioned that, when the armature circuit is first closed, the current will rise to approximately no greater value than when the resistance of the armature circuit is normal, and that, when the resistance of the consuming element is substantially increased suddenly, the current will remain substantially constant.

11. In a system for generating direct current, an armature, leads connecting the armature in series with a current consuming element, a reactance coil in one of the leads, and a shunt field connected across the leads in parallel with the work terminals at points so selected with reference to the resistance in the leads on each side of said points that the high open-circuit voltage will be reduced to such an extent when contact is made to establish a short circuit that the current does not rise substantially above or fall substantially below a predetermined value.

12. In a system for the regulation of the generation of current by direct-current generators, an armature, leads connecting the armature in series with a current-consuming element, a shunt-field winding connected across the leads in parallel with the work terminals at such points as will cause the field to be proportionately strengthened or weakened when the voltage drop across the said element is increased or decreased, respectively, and a reactance in each of the leads between the connections of the latter to the armature and the shunt-field winding.

13. In a system for the regulation of the generation of current by direct-current generators, an armature, leads connecting the armature in series with a current-consuming element, a shunt-field winding connected across the leads in parallel with the work terminals at such points as will cause the field to be proportionately strengthened or weakened when the voltage drop or resistance of the said element is increased or decreased, respectively, and a reactance winding in each of the leads, the shunt-field winding being adjustably connected to the reactance windings.

Signed at Pittsburgh, Pa., this 27th day of August, 1924.

SEWARD W. MANN.